US008739053B2

(12) United States Patent
Chen et al.

(10) Patent No.: US 8,739,053 B2
(45) Date of Patent: May 27, 2014

(54) ELECTRONIC DEVICE CAPABLE OF TRANSFERRING OBJECT BETWEEN TWO DISPLAY UNITS AND CONTROLLING METHOD THEREOF

(75) Inventors: Ming-Yu Chen, Tao-Yuan (TW); Chao-Yi Chen, Tao-Yuan (TW); Cheng-Chieh Chuang, Taoyuan County (TW); Chi-Nien Chen, Tao-Yuan (TW)

(73) Assignee: HTC Corporation, Taoyuan, Taoyuan County (TW)

( * ) Notice: Subject to any disclaimer, the term of this patent is extended or adjusted under 35 U.S.C. 154(b) by 446 days.

(21) Appl. No.: 12/258,462

(22) Filed: Oct. 27, 2008

(65) Prior Publication Data

US 2009/0164930 A1 Jun. 25, 2009

(30) Foreign Application Priority Data

Dec. 25, 2007 (TW) .............................. 96149906 A

(51) Int. Cl.
*G06F 3/048* (2013.01)
*G06F 3/01* (2006.01)
*G06F 3/00* (2006.01)

(52) U.S. Cl.
USPC ........................... 715/769; 715/702; 715/761

(58) Field of Classification Search
USPC ............ 715/702, 761, 769–770; 345/1.1, 1.2, 345/1.3, 173
See application file for complete search history.

(56) References Cited

U.S. PATENT DOCUMENTS

| | | | | |
|---|---|---|---|---|
| 5,111,103 A * | 5/1992 | DuBrucq | .................. | 313/2.1 |
| 6,118,433 A * | 9/2000 | Jenkin et al. | .................. | 345/173 |
| 6,331,840 B1 * | 12/2001 | Nielson et al. | .................. | 345/1.1 |
| 6,545,669 B1 * | 4/2003 | Kinawi et al. | .................. | 345/173 |
| 6,573,913 B1 * | 6/2003 | Butler et al. | .................. | 715/761 |
| 7,190,351 B1 * | 3/2007 | Goren | .................. | 345/173 |
| 7,277,088 B2 * | 10/2007 | Robinson et al. | .................. | 345/173 |
| 7,430,721 B2 * | 9/2008 | Johanson et al. | .................. | 715/761 |
| 7,948,450 B2 * | 5/2011 | Kay et al. | .................. | 345/1.3 |

(Continued)

FOREIGN PATENT DOCUMENTS

| | | |
|---|---|---|
| CN | 1707411 A | 12/2005 |
| EP | 1 770 473 A2 | 4/2007 |

(Continued)

OTHER PUBLICATIONS

Virtual machine, Jul. 12, 2004, http://web.archive.org/web/20040712083524/http://en.wikipedia.org/wiki/Virtual_machine.*

(Continued)

*Primary Examiner* — Matt Kim
*Assistant Examiner* — Maryam Ipakchi
(74) *Attorney, Agent, or Firm* — Winston Hsu; Scott Margo

(57) ABSTRACT

An electronic device includes a housing, a first display unit, a second display unit, a sensing input unit and a processor. The first display unit and the second display unit are both disposed on the housing. The sensing input unit is coupled to the first display unit and the second display unit, and is used for sensing and receiving a user input. The user input enables a transferring behavior of displaying a second object in the second display unit according to a first object displayed in the first display unit. The processor is coupled to the first display unit, the second display unit and the sensing input unit, and is used for controlling the second display unit according to the user input to display the second object.

11 Claims, 6 Drawing Sheets

(56) References Cited

U.S. PATENT DOCUMENTS

| | | | |
|---|---|---|---|
| 7,990,338 B2* | 8/2011 | Teng et al. | 345/1.3 |
| 2002/0039084 A1* | 4/2002 | Yamaguchi | 345/1.1 |
| 2003/0071797 A1* | 4/2003 | Chang et al. | 345/173 |
| 2003/0071832 A1* | 4/2003 | Branson | 345/698 |
| 2004/0021681 A1* | 2/2004 | Liao | 345/702 |
| 2004/0027383 A1* | 2/2004 | Jaeger | 345/769 |
| 2004/0056876 A1* | 3/2004 | Nakajima | 345/702 |
| 2004/0056877 A1* | 3/2004 | Nakajima | 345/702 |
| 2004/0090448 A1* | 5/2004 | Litwiller | 345/702 |
| 2004/0201545 A1* | 10/2004 | Yamazaki et al. | 345/1.1 |
| 2007/0038955 A1* | 2/2007 | Nguyen | 715/804 |
| 2007/0070046 A1 | 3/2007 | Sheynblat | |
| 2007/0075915 A1* | 4/2007 | Cheon et al. | 345/1.1 |
| 2007/0097014 A1* | 5/2007 | Solomon et al. | 345/1.1 |
| 2007/0124697 A1* | 5/2007 | Dongelmans | 715/805 |
| 2007/0198926 A1* | 8/2007 | Joguet et al. | 715/702 |
| 2008/0030484 A1* | 2/2008 | Cho et al. | 345/176 |
| 2008/0163051 A1* | 7/2008 | Olien | 715/702 |
| 2008/0215980 A1* | 9/2008 | Lee et al. | 715/716 |

FOREIGN PATENT DOCUMENTS

| | | | | |
|---|---|---|---|---|
| EP | 1770473 A2 * | 4/2007 | | G06F 1/16 |
| EP | 1 959 451 A1 | 8/2008 | | |
| EP | 1959451 A1 * | 8/2008 | | |
| GB | 2 402 105 A | 12/2004 | | |
| TW | I259697 | 8/2006 | | |
| TW | I284272 | 7/2007 | | |
| WO | 2004029791 A2 | 4/2004 | | |
| WO | 2004029791 A3 | 4/2004 | | |
| WO | 2004051451 A2 | 6/2004 | | |

OTHER PUBLICATIONS

Parallel Virtual Machine, Jul. 31, 2004, http://web.archive.org/web/20040731153451/http://en.wikipedia.org/wiki/Parallel_Virtual_Machine.*

Office action mailed on Dec. 27, 2011 for the Taiwan application No. 096149906, filing date Dec. 25, 2007, p. 1-3.

Office action issued on May 17, 2011 for EP application No. 08020078.5, filing date Nov. 18, 2008, pp. 1-8.

* cited by examiner

ELECTRONIC DEVICE CAPABLE OF TRANSFERRING OBJECT BETWEEN TWO DISPLAY UNITS AND CONTROLLING METHOD THEREOF

BACKGROUND OF THE INVENTION

1. Technical Field

The application relates to an electronic device, and more particularly, to an electronic device having a first display unit, a second display unit and a sensing input unit, that enables an object transferring behavior between the first and second display unit according to a user input sensed and received by the sensing input unit, and a method thereof.

2. Description of the Prior Art

In general, there is a primary screen for displaying the main content and other secondary screens for displaying the supplementary information in a hand-held electronic device having screens. Taking a dual-screen flip mobile phone for example, the user is able to control the displayed content of the primary screen via an input element of the mobile phone, such as keys on the mobile phone keypad. However, the user is unable to control the information of the secondary screen via the input element of the mobile phone since the secondary screen is only for displaying the supplementary information, such as time, missed calls, or unread messages. In other words, the content of the primary screen and the information of the secondary screen can not communicate or interact with each other on a conventional dual-screen mobile phone.

SUMMARY OF THE INVENTION

It is therefore one of the objectives of the application to provide an electronic device capable of utilizing a sensing input unit to enable a transferring behavior of displaying a second object in a second display unit according to a first object displayed in a first display unit and a method thereof, in order to solve the above-mentioned problem. A user can select the information intended to be displayed on the second display in a more direct way and interact with the display units. This results in interest and novelty to the operation.

According to an exemplary embodiment of the present invention, an electronic device is disclosed. The electronic device comprises: a housing; a first display unit, disposed on the housing; a second display unit, disposed on the housing; a sensing input unit, which is coupled to the first display unit and the second display unit, and is for sensing and receiving a user input, wherein the user input enables a transferring behavior of displaying a second object in the second display unit according to a first object displayed in the first display unit; and a processor, which is coupled to the first display unit, the second display unit and the sensing input unit, and is for controlling the second display unit to display the second object according to the user input.

According to an exemplary embodiment of the present invention, a display control method is disclosed. The display control method comprises: receiving a first user input, wherein the user input enables a transferring behavior of displaying a second object in a second display unit according to a first object displayed in a first display unit; and controlling the second display unit to display the second object according to the first user input.

These and other objectives of the application will no doubt become obvious to those of ordinary skill in the art after reading the following detailed description of the preferred embodiment that is illustrated in the various figures and drawings.

DETAILED DESCRIPTION

Figure 1:
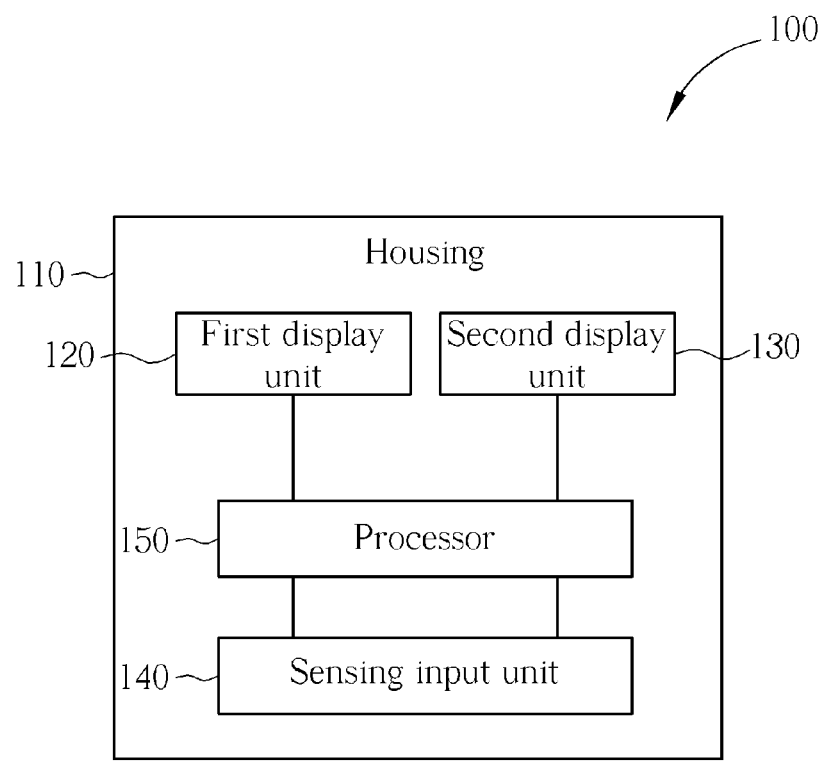
FIG. 1 is a block diagram illustrating an electronic device according to an embodiment of the present invention.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ".

Different features of the present invention are detailed as below with reference to the figures, and for convenience of explanation, the same elements in different figures have the same reference numerals.

Please refer to FIG. 1. FIG. 1 is a block diagram illustrating an electronic device 100 according to an embodiment of the present invention. As presented in FIG. 1, the electronic device 100 comprises a housing 110, a first display unit 120, a second display unit 130, a sensing input unit 140 and a processor 150. The first display unit 120 and the second display unit 130 are both disposed on the housing 110. The sensing input unit 140 is coupled to the first display unit 120 and the second display unit 130, and is utilized for sensing and receiving a user input. The user input enables a transferring behavior of displaying a second object in the second display unit 130 according to a first object displayed in the first display unit 120. The processor 150 is coupled to the first display unit 120, the second display unit 130 and the sensing input unit 140, and is utilized for controlling the second display unit 130 to display the second object according to the user input. In this embodiment, the electronic device 100 is a bar-type electronic device; this is, however, merely for illustrative purposes, and is not a limitation of the application. In other embodiments, the electronic device 100 can be a hand-held communication device, a hand-held computing device and a personal digital assistant (PDA).

Figure 2:
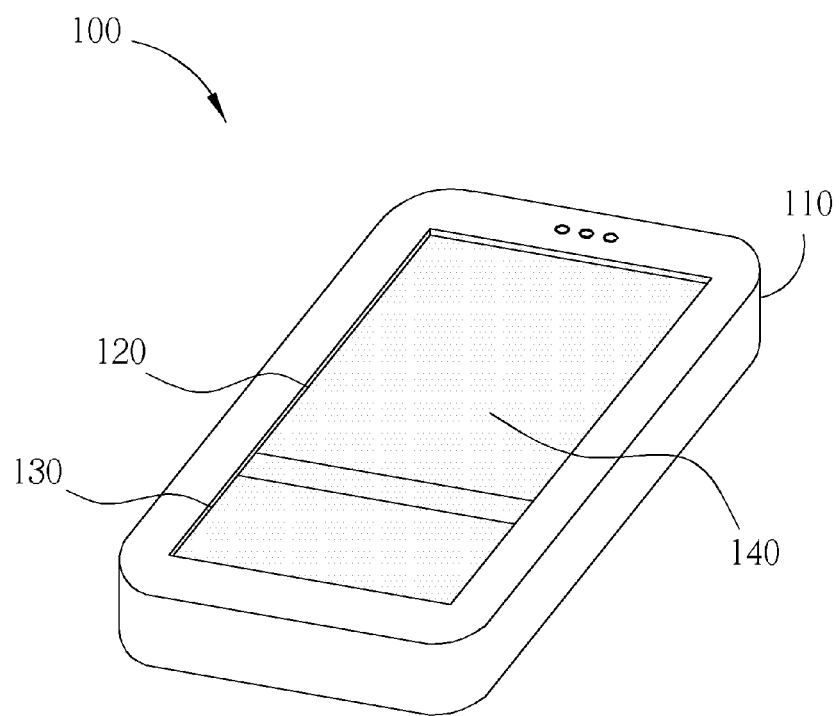
FIG. 2 is a schematic diagram illustrating the electronic device presented in FIG. 1.
Figure 3:
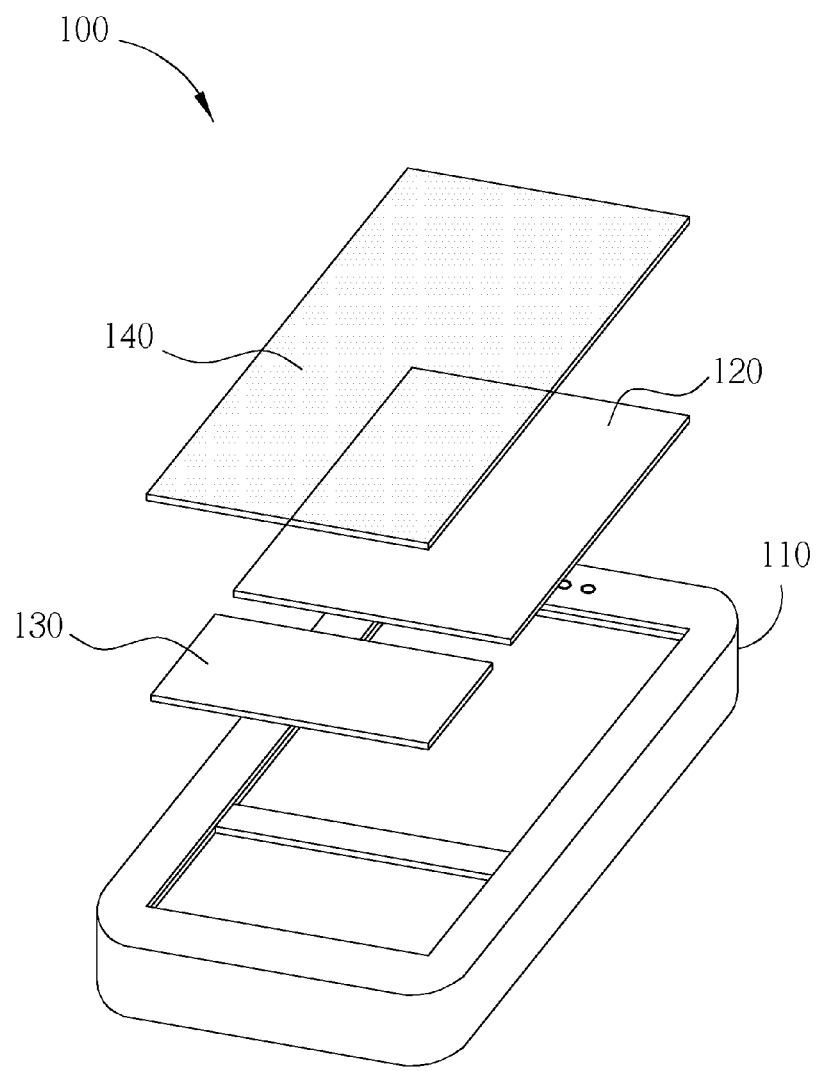
FIG. 3 is an exploded-view diagram illustrating the electronic device presented in FIG. 2.

Please refer to FIG. 2 and FIG. 3. FIG. 2 is a schematic diagram illustrating the electronic device 100. FIG. 3 is an exploded-view diagram illustrating the electronic device 100. In this embodiment, the first display unit 120 is a primary display screen; the second display unit 130 is a secondary display screen, and the sensing input unit 140 is a touch panel. As presented in FIG. 2 and FIG. 3, the sensing input unit 140 (i.e., the touch panel) covers both the first display unit 120 and the second display unit 130. However, this is merely for illustrative purposes, and is not a limitation of the application. In other embodiments, the sensing input unit may only cover the first display unit. In practice, only a portion of the sensing input unit positioned on top of the first display unit is also acceptable. For example, a portion of the sensing input unit is positioned on the first display unit but not all the first display is covered by the sensing input unit. In addition, in other embodiments of the present invention, the electronic device comprises a first sensing input unit and a second sensing input unit. The first sensing input unit covers the first display unit, and the second sensing input unit covers the second display unit. This alternative design also falls within the scope of the application.

Figure 4:
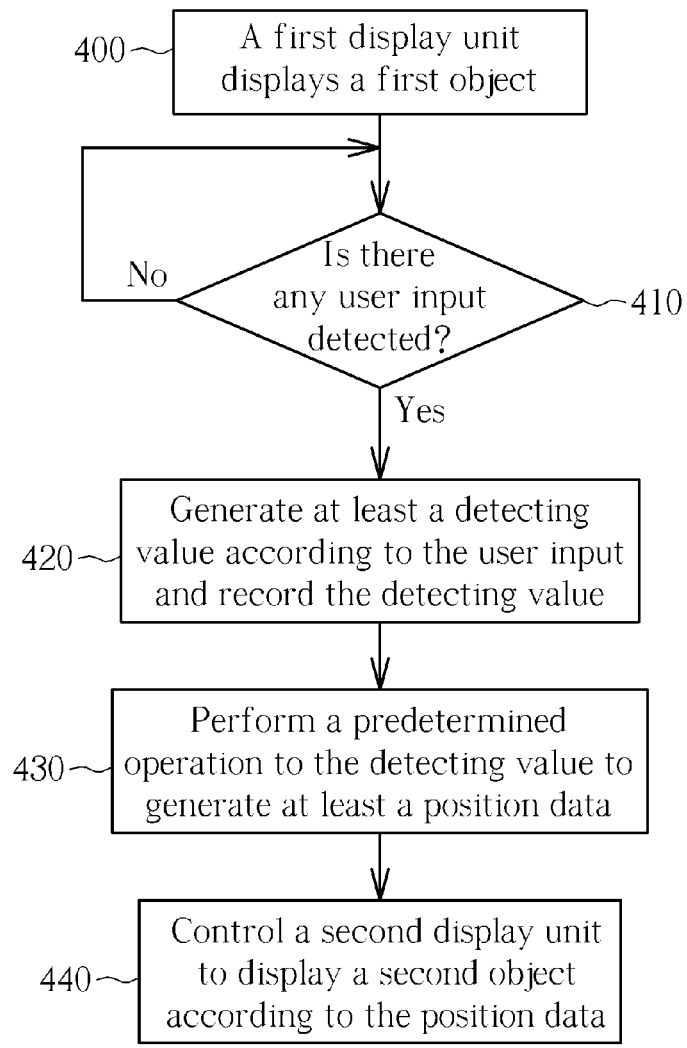
FIG. 4 is a flowchart illustrating a display control method according to an embodiment of to the present invention.

Please refer to FIG. 4. FIG. 4 is a flowchart illustrating a display control method according to an embodiment of to the present invention. The steps of the display control method are as follows:

Step 400: A first display unit displays a first object.

Step 410: Is there any user input detected? If yes, go to step 420; otherwise, back to step 410 to continuously detect whether there is a user input;

Step 420: Generate at least a detecting value according to the user input and record the detecting value;

Step 430: Perform a predetermined operation to the detecting value to generate at least a position data;

Step 440: Control a second display unit to display a second object according to the position data.

Figure 5:
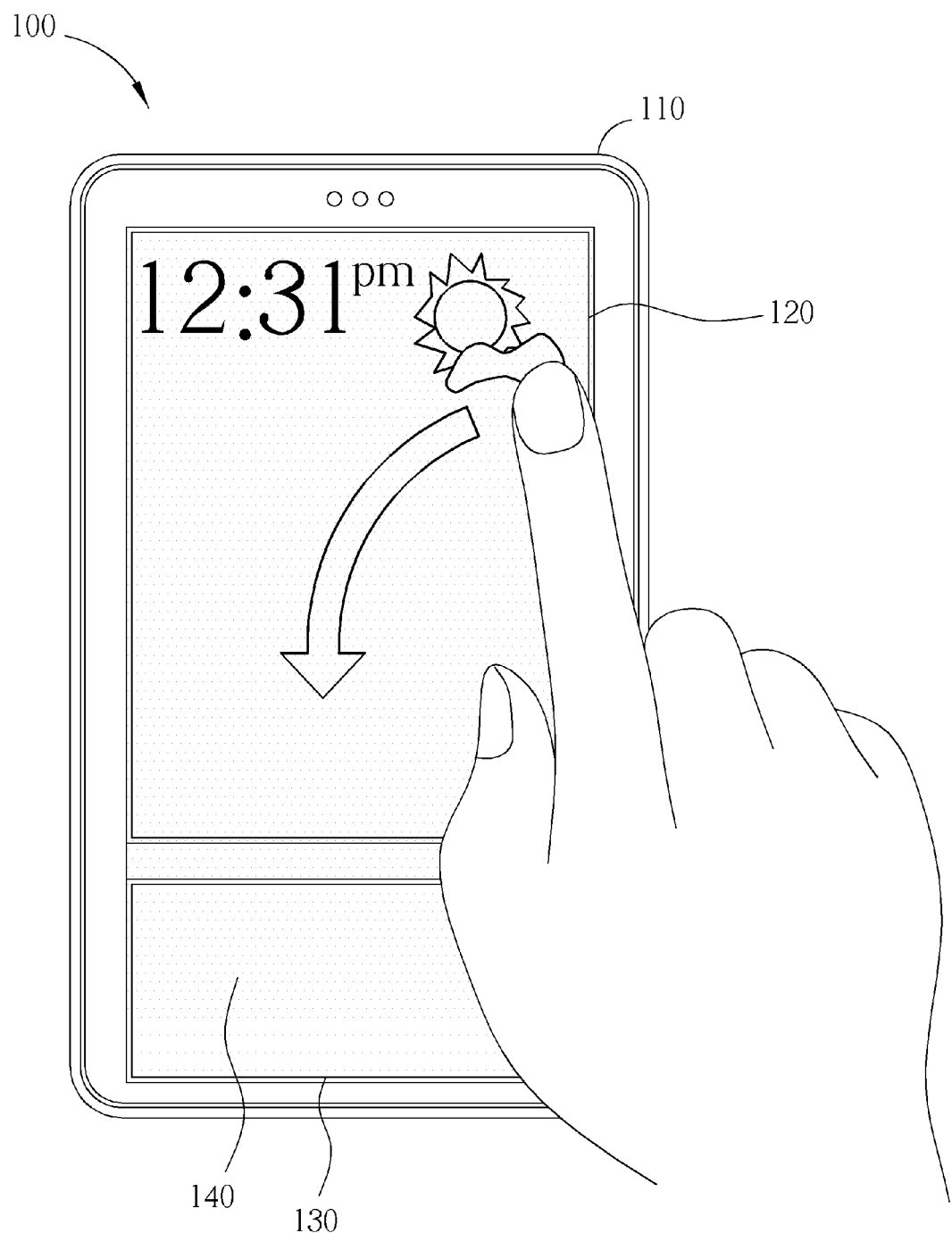
FIG. 5 is a diagram illustrating the electronic device presented in FIG. 2 executing a transferring behavior.

Further description of the operation of the electronic device 100 of the application is detailed below with reference to FIG. 4, FIG. 5 and FIG. 6. To make the concept of the application easily appreciable, a figure taken as the first object displayed on the first display unit 120 is utilized in the following embodiment to illustrate the present invention; this is, however, for illustrative purposes and not a limitation of the application. In other embodiments, for example, the first display unit 120 can be a character, a number, a symbol, an animation and so on. In addition, since the application emphasizes the transferring behavior between the two display units, it is not limited to control the second display unit according to the detecting value generated from the first display unit. In other words, the first display unit can be controlled according to a detecting value generated from the second display unit.

In the electronic device 100, the sensing input unit 140 detects whether there is a user input inputted (Step 410) while the first display unit 120 displays a first object (Step 400). When a user uses his or her finger to select the first object on the first display unit 120 and drags or moves the first object via the finger on top of the sensing input unit 140 (i.e., the touch panel), as presented in FIG. 5, the sensing input unit 140 detects a user input (selection and movement), and the processor 150 generates a detecting value according to the user input and records the detecting value (Step 420). For example, in this embodiment, the detecting value corresponds to the position where the touch panel is last touched by the finger prior to the finger moving off the touch panel, as presented in FIG. 6. Next, the processor 150 performs a predetermined operation to the detecting value to generate at least a position data (x, y) (Step 430), which indicates the position where a second object is to be displayed on the second display unit 130. Lastly, the processor 150 controls the second display unit 130 to display the second object according to the position data (Step 440). Please note that user is not limited to using a finger to control the electronic device 100. In practice, a user is able to use any pointer capable of being detected by the sensing input unit 140, such as a stylus, to control the electronic device 100, and drag or move the selected object to a designated position as in the steps 400~440 presented in FIG. 4. In addition, the user input can also enable a transferring behavior of displaying a third object, which is intended to be displayed in the first display unit 120, according to the second object displayed in the second display unit 130. After reading the above-mentioned description for the operation of the electronic device 100, a corresponding method for how to enable the transferring behavior of displaying the third object in the first display unit 120 according to the second object displayed in the second display unit 130 should be readily appreciated by those skilled in the art, so further description is omitted here for the sake of brevity.

As mentioned above, the position data (x, y) is used to determine where the selected object is moved to. However, if the sensing input unit doesn't cover both display units or there are two independent sensing input units, for example, (a) a portion of the sensing input unit is positioned on the first display unit, but doesn't not cover all of the first display unit and not any of the second display unit covered; (b) all of the sensing input unit is positioned on the first display unit, but doesn't not cover any of the second display unit; (c) the first and second display units have a respective sensing input unit in the electronic device Thus, the selected object cannot be directly moved to the designated position because the user input is not able to be continuously detected as three situations stated above. Under these situations, the processor 150 compares y, called Y coordinate value, in the position data (x, y) with a first threshold value $y_{th1}$, and the Y coordinate value is set to be increasing from up to down. When the sensing input unit 140 detects a user input, the processor 150 would generate a detecting value according to the user input and record the detecting value. Then, the processor 150 would perform a predetermined operation to generate a position data $(x_{Input}, y_{Input})$ with a first $y_{Input}$ value of Y coordinate. Here, we just take the y value of Y coordinate for example; and x value of X coordinate is vice versa. If $y_{Input}$ is greater than the first threshold value $y_{th1}$, the processor determines that the transfer behavior successfully moves or drags the selected object from the first display unit to the second display unit; otherwise, the processor determines that the transfer behavior fails to move or drag the selected object from the first display unit to the second display unit, and the selected object stays in an original or another position in the first display unit. Similarly, a second threshold value $y_{th2}$ can be set for the second display unit to determine whether the selected object displayed on the second display unit is able to be moved to the first display unit. The operation theory is same as the first threshold value $y_{th1}$, so further description is omitted here for the sake of brevity.

Figure 6:
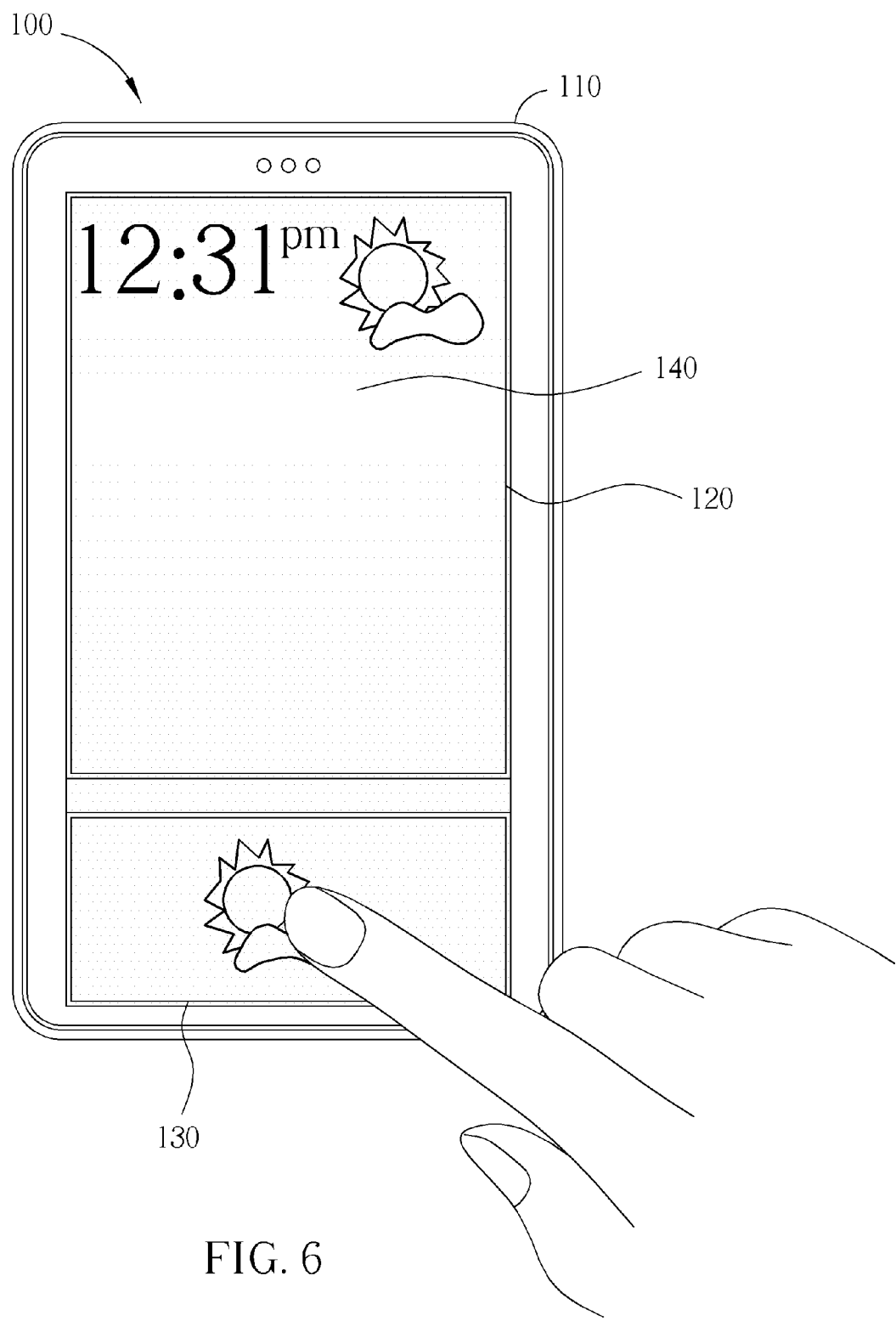
FIG. 6 is another diagram illustrating the electronic device presented in FIG. 2 executing the transferring behavior.

As presented in FIG. 6, the processor 150 controls the first display unit 120 to continuously display the first object when the processor 150 controls the second display unit 130 to display the second object, and the first object and the second object are the same figure. In other words, the transferring behavior is copying the first object displayed on the first display unit 120 to the second display unit 130; this is, however, merely for illustrative purposes, and is not a limitation of the application. For example, the processor 150 can control the first display unit 120 not to display the first object when the processor 150 controls the second display unit 130 to display the second object. That is, the transferring behavior enabled by the user input is dragging the first object displayed on the first display unit 120 to the second display unit 130. In other embodiments, the processor 150 can further execute a predetermined program related to the first object after moving (copying/dragging) the first object, such as executing the predetermined program to play an audio/video file, to display the time information and so on.

Please note that in the above embodiment, the first object and the second object are the same figure; this is, however, not a limitation of the application. In other embodiments, the first object and the second object can be different figures respectively. In addition, a presenting pattern of the second object is the same as a presenting pattern of the first object (i.e., the presenting pattern of the first and second object are both figures); this is, however, is not a limitation of the application. In other embodiments of the present invention, the presenting pattern of the second object can differ from the presenting pattern of the first object.

Please note that in the above embodiment, the second display unit 130 is a flexible display; this is, however, is not a limitation of the application. In other embodiments, the second display unit can be a cold cathode fluorescent lamp (CCFL) display, a light emitting display (LED) or a non-volatile display (e.g., an electronic paper). In addition, the electronic device 100 further comprises a key switch, which is disposed under the second display unit 130 and is figured to provide a user with a haptic feedback when the user moves the finger on top of the sensing input unit 140. The key switch can be implemented by a dome switch, a membrane or a mechanical switch.

Please note that in the above embodiment, the sensing input unit 140 is a touch sensor (touch panel); this is, however, is not a limitation of the application. In other embodiments, the sensing input unit can be a non-touch sensor, such as a motion sensor (e.g., a G-sensor or a Gyroscope), a light sensor, an ultrasonic sensor or an image capturer. The user input detected and received by the sensing input unit changes with the type of the sensing input unit. For example, the user input can be detected by at least one of the following movements: moving/waving the finger/pointer, or moving/rotating/touching/patting the electronic device. Since the corresponding relation between the different user inputs and sensing input units should be readily appreciated by those skilled in the art, further description is omitted here for the sake of brevity.

Compared with the prior art, the electronic device of the application comprises a secondary display screen (i.e., the second display unit) and a touch panel (i.e., the sensing input unit). The secondary display screen is not only for displaying the information, but also be controlled via the touch panel to allow the user to communicate with the electronic device of the application in a more direct way.

Those skilled in the art will readily observe that numerous modifications and alterations of the device and method may be made while retaining the teachings of the application.

What is claimed is:

1. An electronic device, comprising:
a monolithic housing comprising a plurality of portions;
a first display unit disposed on the monolithic housing;
a second display unit disposed on the monolithic housing;
a sensing input unit coupled to the first display unit and the second display unit for sensing and receiving an input, wherein the input enables a transferring behavior of displaying a second object in the second display unit according to a first object displayed in the first display unit and displaying a third object in the first display unit according to the second object displayed in the second display unit; and
a processor coupled to the first display unit, the second display unit and the sensing input unit, for controlling the second display unit to display the second object according to the input and controlling the first display unit to display the third object according to the input;
wherein the sensing input unit is a single continuous touch panel, and the single continuous touch panel is positioned on the first display unit and the second display unit and covers both of the first display unit and the second display unit; the first display unit and the second display unit are separated by one of the portions of the monolithic housing; and the electronic device is a hand-held telecommunication device.

2. The electronic device of claim 1, wherein the transferring behavior comprises copying, dragging, panning or executing a program.

3. The electronic device of claim 1, wherein the sensing input unit receives the input corresponding to the first display unit and generates at least a detecting value according to the input, the processor performs a predetermined operation according to the detecting value to generate at least a position data, and the processor controls the second display unit to display the second object according to the position data.

4. The electronic device of claim 1, wherein the processor further controls the first display unit to display the first object continuously while the second display unit is displaying the second object.

5. The electronic device of claim 4, wherein a displayed pattern of the second object differs from a displayed pattern of the first object.

6. The electronic device of claim 1, wherein the processor further controls the first display unit not to display the first object while the second display unit is displaying the second object.

7. The electronic device of claim 6, wherein a displayed pattern of the second object differs from a displayed pattern of the first object.

8. The electronic device of claim 1, wherein the first object comprises a character, a number, a symbol, a figure or an animation, and the second object is a character, a number, a symbol, a figure or an animation.

9. The electronic device of claim 1, wherein the second display unit comprises a cold cathode fluorescent lamp (CCFL) display, a light emitting display (LED) or a non-volatile display.

10. The electronic device of claim 1, wherein the second display unit is a flexible display, and the electronic device further comprises a key switch for providing haptic feedback when the sensing input unit receives the input.

11. An electronic device, comprising:
a housing comprising a plurality of portions;
a first display unit disposed on the housing;
a second display unit disposed on the housing;
a sensing input unit coupled to the first display unit and the second display unit for sensing and receiving a first input corresponding to the first display unit and a second input corresponding to the second display unit, wherein the first input enables a transferring behavior of displaying a second object in the second display unit according to a first object displayed in the first display unit, and the second input enables a transferring behavior of displaying a third object in the first display unit according to the second objected displayed in the second display unit; and
a processor coupled to the first display unit, the second display unit and the sensing input unit, for controlling the second display unit to display the second object according to the first input and controlling the first display unit to display the third object according to the second input;
wherein the sensing input unit generates at least a first detecting value according to the first input, the processor performs a predetermined operation according to the first detecting value to generate at least a first position data, and the processor controls the second display unit to display the second object according to the first position data; the first position data indicates a position where the second object is to be displayed on the second display unit; the sensing input unit generates at least a second detecting value according to the second input; the processor performs a predetermined operation according to the second detecting value to generate at least a second position data, and the processor controls the first display unit to display the third object according to the second position data; and the electronic device is a hand-held telecommunication device, and the sensing input unit is a single continuous touch panel, and the single continuous touch panel is positioned on the first display unit and the second display unit and covers both of the first display unit and the second display unit; the first display unit and the second display unit are separated by one of the portions of the housing.

* * * * *